(12) United States Patent
Herington et al.

(10) Patent No.: US 8,650,579 B1
(45) Date of Patent: Feb. 11, 2014

(54) CONTAINMENT FOR COMPUTER-SOFTWARE UPDATE INSTALLATION PROCESSES

(75) Inventors: Daniel Edward Herington, Dallas, TX (US); Deborah Jane Ogden, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1719 days.

(21) Appl. No.: 11/927,083

(22) Filed: Oct. 29, 2007

Related U.S. Application Data

(63) Continuation-in-part of application No. 11/669,852, filed on Jan. 31, 2007.

(51) Int. Cl.
*G06F 9/46* (2006.01)
*G06F 9/455* (2006.01)

(52) U.S. Cl.
USPC .............................................. 719/313; 718/1

(58) Field of Classification Search
USPC .............................................. 718/1; 719/313
See application file for complete search history.

(56) References Cited

U.S. PATENT DOCUMENTS

| | | | |
|---|---|---|---|
| 5,761,678 A | 6/1998 | Bendert et al. | |
| 5,922,072 A * | 7/1999 | Hutchinson et al. | 713/2 |
| 7,673,308 B2 * | 3/2010 | McMillan et al. | 719/331 |
| 2002/0065776 A1* | 5/2002 | Calder et al. | 705/51 |
| 2005/0197815 A1* | 9/2005 | Grebenev | 703/14 |
| 2006/0036570 A1* | 2/2006 | Schaefer et al. | 707/1 |
| 2006/0174238 A1 | 8/2006 | Henseler et al. | |
| 2007/0083655 A1* | 4/2007 | Pedersen | 709/226 |
| 2008/0127355 A1* | 5/2008 | Lorch et al. | 726/29 |

OTHER PUBLICATIONS

Daliparthy et al. "Provisioning in Replicated, Mission-Critical Environments" Mar. 2003 Sun Blueprints Online pp. 1-16.*

* cited by examiner

*Primary Examiner* — Charles E Anya

(57) ABSTRACT

Process containment is used to block at least some communications between installation processes and production processes.

10 Claims, 3 Drawing Sheets

CONTAINMENT FOR COMPUTER-SOFTWARE UPDATE INSTALLATION PROCESSES

This is a continuation-in-part of copending U.S. patent application Ser. No. 11/669,852 filed on Jan. 31, 2007.

BACKGROUND OF THE INVENTION

Computer software programs are frequently updated to add features, to address defects and incompatibilities, and to improve security. The updates can involve adding, removing, and modifying software. Programs not needed during installation are typically shut down so their operation is not inadvertently impacted by the installation process. However, in some situations such as enterprise computing, downtime can be quite costly and, thus, needs to be minimized.

"Dynamic Root Disk" (DRD) software, available from Hewlett-Packard Company, addresses this cost issue by allowing operating systems and applications to continue running while a clone of the root volume group is updated. The DRD software creates the clone and then redirects software management operations from original files to their clones. Thus, an update applied under DRD software updates the clone instead of the original instance of a program, which can continue to run during updating. Once the clone is updated, the system can be rebooted to the updated clone; downtime is limited to the reboot.

Herein, related art is presented to aid in understanding the present invention. Related art labeled "prior art" is admitted prior art; related art not labeled "prior art" is not admitted prior art.

BRIEF DESCRIPTION OF THE DRAWINGS

The following figures are of implementations or embodiments of the invention and are not depictions of the invention itself.

DETAILED DESCRIPTION

In the course of the present invention, it was recognized that while DRD software protected files used for production processes from being impacted by installation procedures, it was still possible for ongoing processes to be impacted. Some update packages can include scripts that call for processes to be started, modified, or shut down. For example, an update package might contain a script that shuts down processes associated with an application program to be updated (unaware that the instance being updated is different from the instance that is running). An update package might also include a script for modifying the kernel of the active operating system instance. Such scripts can impact production processes in unintended ways.

The present invention uses process containers to address this vulnerability. Process containers, available from Hewlett-Packard Company, were developed to ensure stability and security by isolating some processes from other processes that might otherwise pose a risk of interference. For example, process containers can be used to isolate an operating system kernel from network processes that might serve as entry points for malicious and unintended security threats. Thus, if an intruder manages to break into a system, e.g., via network connections, its ability to affect non-network, e.g., production processes, is severely limited.

A "process container" can contain one or more processes; processes do not move across containment boundaries. Typically, communications between processes in the same container are allowed, while cross-boundary inter-process communications are restricted and usually blocked. Process containment systems operate by intercepting inter-process communications so that they can be passed, blocked, or altered according to established rules or criteria.

The present invention uses process containers for a non-security purpose in the context of software updates. In particular, installation processes can be separated from production processes by process containers. This prevents update scripts from detecting, stopping, starting, or modifying production processes during update installation. Thus, software updates can be installed without fear that an update script will interfere with production processes.

Figure 1:
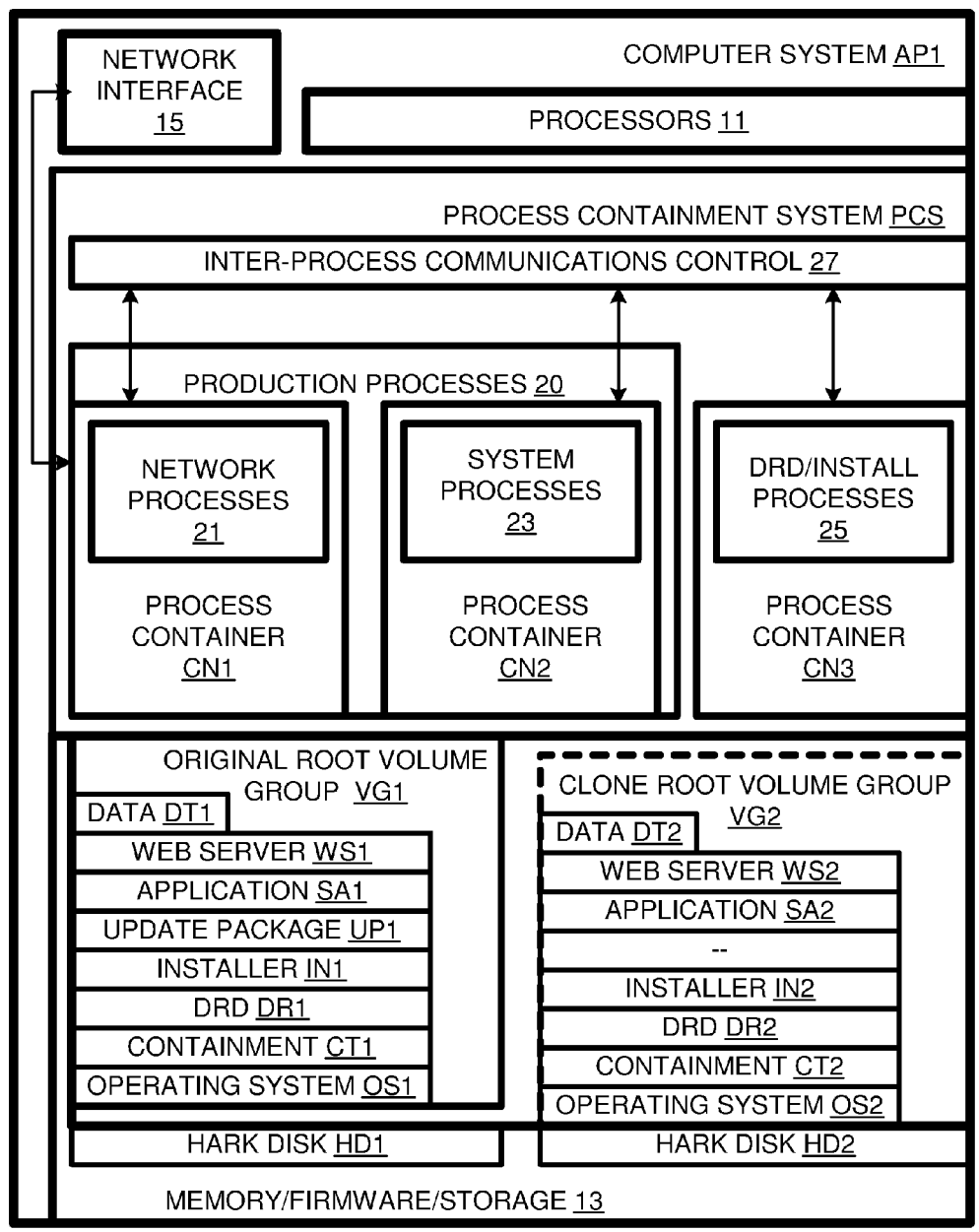
FIG. 1 is a schematic diagram of a computer system in accordance with an embodiment of the present invention.

As shown in FIG. 1, computer system AP1 includes processors 11, computer-readable media (memory/firmware/storage (RAM, ROM, flash and disk-storage) 13, and a network interface 15. Initially, media 13 stores data DT1 and computer-executable programs for manipulating data. These programs are part of an original root volume group VG1 and include an operating system OS1, process containment software CT1, DRD software DR1, an installer IN1, a software application SA1, and a web server WS1.

Process containment software CT1 is used to set up process containers CN1, CN2, and CN3 for two purposes: 1) installation processes are separated from production processes as provided for by the invention; 2) network processes are separated from system processes and installation processes for security purposes in accordance with the original use of process containers. In an alternative embodiment of the invention, installation processes are isolated from production processes, but no further separations are provided for security or other purposes.

Figure 2:
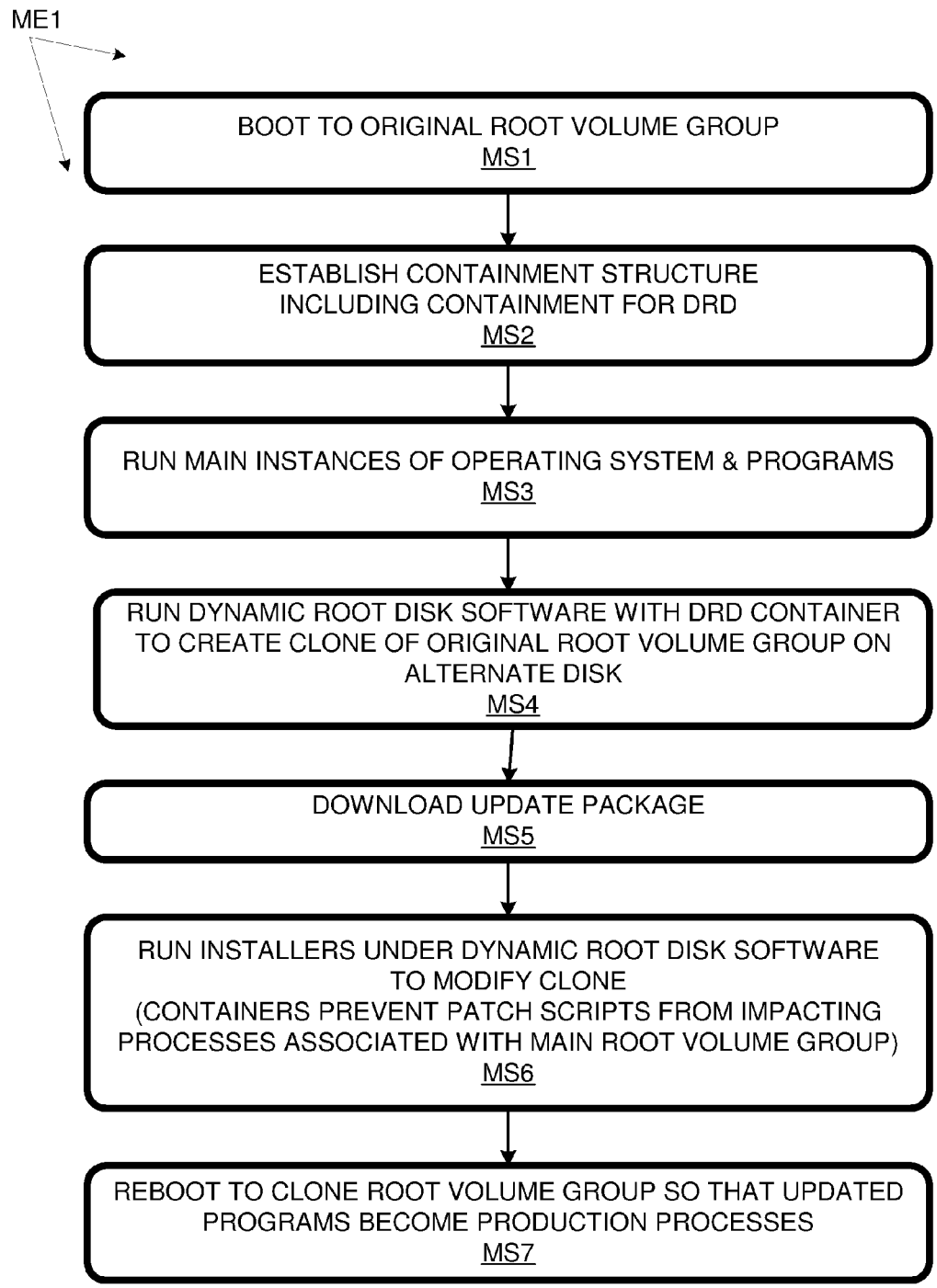
FIG. 2 is a flow chart of a method in accordance with an embodiment of the invention practiced in the context of the system of FIG. 1.

A method ME1 in accordance with an embodiment of the invention is flow-charted in FIG. 2. System AP1 is booted, at method segment MS1, from original boot disk HD1 so that original root volume group VG1 becomes the booted root volume group. Root volume group VG1 includes a disk image for operating system instance OS1, as well as images for other software.

Once operating system OS1 is running, containment system PCS is established, at method segment MS2, with containers CN1 for network processes 19 (e.g., associated with web server WS1), CN2 for system processes 21 (e.g., associated with operating system OS1 and application SA1), and CN3 for DRD/installation processes 23 (e.g., associated with DRD DR1, and installer IN1. Containment system PCS need not be established all at once. For example, containers CN1 and CN2 can be defined first, and container CN3 can be formed later when a software update is anticipated.

Operating system OS1, containment software CT1, software application SA1, web server WS1, and DRD software DR1 are run at method segment MS3, with processes allocated to containers CN1, CN2 and CN3 as dictated by container system PCS. More specifically, network processes 21 that are relatively exposed to external threats are run in process container CN1, while system processes 23 are isolated from such threats by being run in separate process container CN2. Processes associated with DRD software DR1 are confined to container CN3 so that production processes 20, which include network processes 21 and system processes 23, are protected from installation processes.

DRD software DR1 creates a clone of the current root volume group on a spare hard disk HD2 at method segment MS4. Note that DRD software DR1 does not have to be isolated from production processes 21 and 23 for cloning purposes, so it need not be in a separate container at this point. If the disk on which the clone is to be stored is unmounted, DRD software DR1 can temporarily mount that disk. Once clone volume group VG2 is created on it, hard disk HD2 can be unmounted. The clone volume group VG2 includes a second operating system instance OS2, containment software CT2, DRD software DR2, installer IN2, application SA2, and web server SA2. Each of these is identical to the corresponding original file. However, they exist only as files: none of the active processes are associated with these clone instances at the time represented in FIG. 1.

An update package UP1 can be downloaded, e.g., from a vendor site, at method segment MS5. To avoid creating a useless clone of the update package, it can be downloaded either 1) to original root volume group VG1 after clone root volume group VG2 is made, or 2) to a "depot" network location not in either VG1 or VG2.

Actual update installation takes place at method segment MS6. Installer IN1 performs software installation as directed by update package UP1 under DRD software DR1. The DRD software redirects accesses intended for original volume group VG1 to volume group GR2, in other words, from original instances of program files to clone instances. Containment system CNS blocks or at least restricts communications and interactions between production and installation processes. Hence, the scripts cannot start, stop, or modify network production processes 20 (including network processes 21 and system processes 23). For example, a script may be designed to detect and shutdown a process associated with software application SA1 that is to be modified. In such a case, DRD software DR1 prevents the script from detecting any active processes associated with application instance SA1, so operation is not interrupted as instance SA2 is updated.

Once updating is complete, system AP1 can be rebooted to clone root volume group VG2 at method segment MS7. In this case, operating system instance OS2 becomes active. Likewise, containment software CT2, DRD software DR2, installer IN2, application SA2, and web server WS2 become the sources of active processes. Thus, updating can be achieved with interruption limited to a reboot instead to the full duration of the updating. The state of system AP1 upon completion of method MD is represented in FIG. 3.

Figure 3:
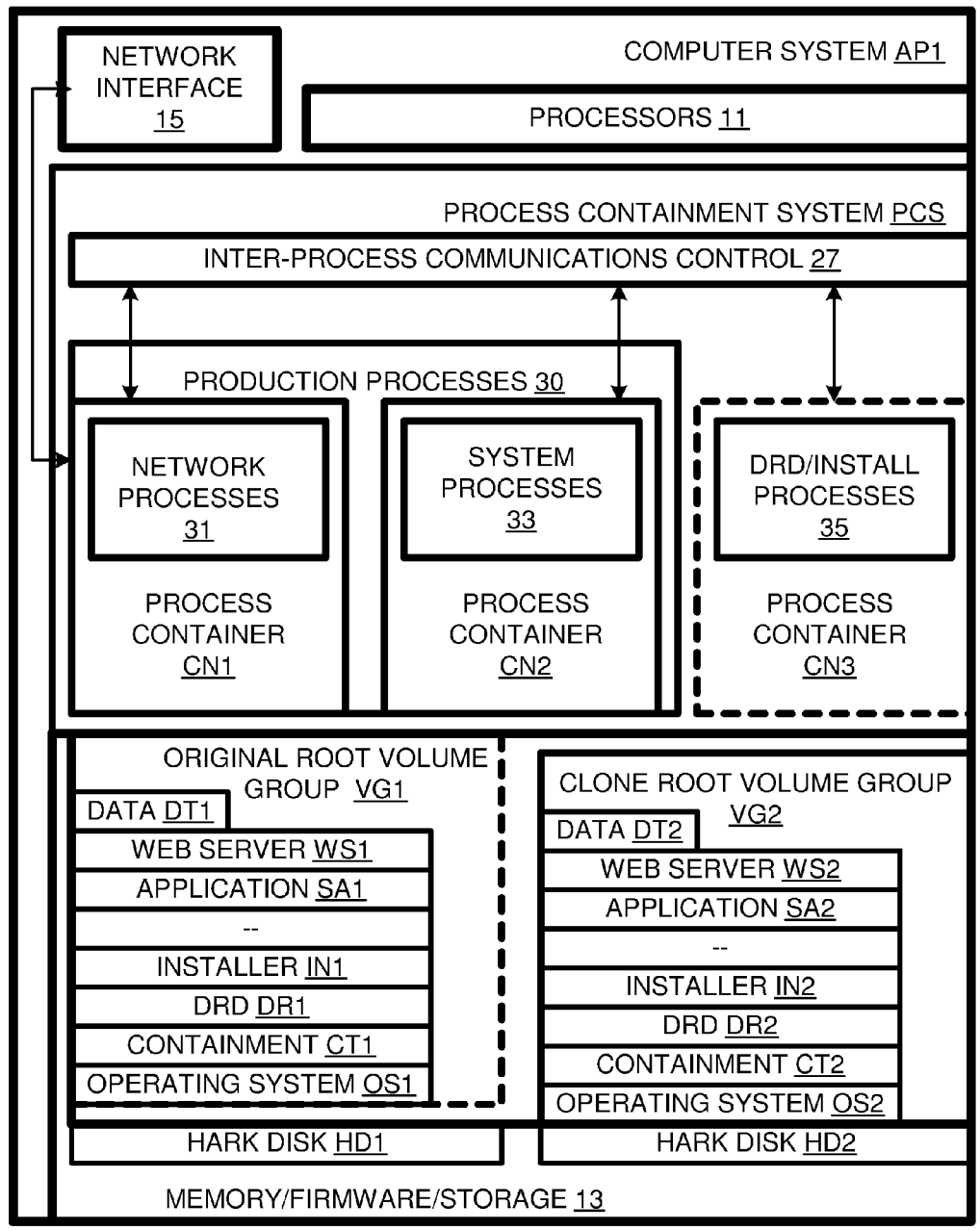
FIG. 3 is a schematic diagram of the computer system of FIG. 1 after completion of the method of FIG. 2.

At the time represented in FIG. 3, clone root volume group is booted and original root volume group VG1 is inactive (as indicated by the dashes around it. Accordingly, process containers CN1 and CN2, include production processes 30 including network processes 31, system processes 33; in addition, in the event of a future installation process, and DRD/installation processes 35 (the later in the case of a future installation), process container CN3 can be re-established for DRD/install processes 35. Update package UP1 is not represented in FIG. 3, as it is removed by installer IN1 when installation is complete. Of course, no update package was ever present in clone root volume group VG2, so none is represented in FIG. 3.

In accordance with the embodiment of the invention illustrated in FIG. 1, process containment is used in conjunction with dynamic root disk technology to relax constraints on installer procedures. In this embodiment, update/install processes are separated from production processes 20. While network processes 21 and system processes 23 are separated for security reasons, production and update processes are separated to protect production processes from errant installation scripts.

The invention applies to the underlying features of dynamic root disk technology and security containment technology, regardless of vendor or label. Thus, the invention applies to alternative file system managers that, like dynamic root disk technology, establish alternative file systems and redirect accesses to files in a main file system to copies in an alternative file system. In the case of dynamic root disk technology, an alternative file system is located on a disk other than the root disk. Likewise, since security containers are used for a non-security purpose, they can be referred to as "process containers". The present invention provides for controlled inter-process communications to protect production processes from installation processes, whether or not the technology is concurrently used for security.

The invention relaxes constraints on installers and the update packages being installed used in a dynamic root disk context. For example, some installation programs are designed to detect processes associated with active instances of a program to be updated. Process containers are designed to prevent or at least restrict interprocess communications so that the installation process cannot detect a production process and, therefore, cannot modify it or shut it down. Without the present invention, such a program might otherwise shut down, modify, or start a production instance, e.g., of a daemon. The present invention can prevent the installer from detecting the production process so that installation can continue without interfering with it.

The invention thus makes it easier to apply dynamic root disk technology to installers and update packages designed without that technology in mind. While the developer of an operating system incorporating dynamic root disk technology can be expected to make installers that are safe for that context, the same cannot always be expected of third-party application developers. Thus, the invention broadens the range of programs that can be updated while production instances are running. Moreover, the invention reduces constraints on the operating-system developer, potentially allowing for simpler and more effective installation programs. The operating-system developer and others also have the option of developing "aware" installers and update packages that detect whether or not an embodiment of the invention is installed, and optimizing the installation process accordingly.

Herein, a "process" is an instance of a computer program or a portion of a computer program that is being sequentially executed. While a program itself is just a passive collection of instructions, a process is the actual execution of those instructions. Several processes may be associated with the same program—each would execute independently (multithreading—where each thread represents a process), either synchronously (sequentially) or asynchronously (in parallel). Modern computer systems allow multiple programs and processes to be loaded into memory at the same time and, through time-sharing (or multitasking), give an appearance that they are being executed concurrently even if there is just one processor. Similarly, using a multithreading OS and/or computer architecture, parallel processes of the same program may actually execute simultaneously (on different CPUs) on a multiple CPU machine or network.

A "process container" is an intra-OS partition within which one or more processes can run. Whereas processes within a container can interact and communicate according to design, interactions and communications between processes in separate containers can be monitored and subject to conditions and restrictions. Process containers control interaction and communication between processes running under the same operating system instance. A process container or a pair of process containers defines a process boundary across which communications can be prevented or restricted. Other technologies, e.g., network protocols, govern interactions among processes running on different OS instances.

A "computer" is a machine that manipulates data in accordance with a program of computer-executable instructions. A "computer program" or just "program" is a collection of computer-executable instructions that describes a task, or set of tasks, to be carried out by a computer. More formally, a program can be described as an expression of a computational method written in a computer language. Commercial computer programs aimed at end users are commonly referred to as application software by the computer industry, as these programs are focused on the functionality of what the computer is being used for (its application), whereas an "operating system" is a program or set of programs focused on system-level functionality. In practice, colloquially, both application software and system software may correctly be referred to as "programs", as may the more esoteric firmware—software firmly built into an embedded system.

Herein, an "update" is a change in a software program or programs intended for example to remove defects, add functionality, or improve security. An "update package" is a file or a set of files that are used to replace, modify, remove, or add files to effect an update. The update package can include "update files", which are files that are to be written to particular directory locations, either as new files or replacement files. An update may include an executable installer program; alternatively, a resident installer program may be used to apply the update using the update package. In the latter case, the update package can include scripts that are executed by the installer, e.g., to modify or remove existing program files.

As noted above, the invention applies to both multi-node stand-alone and distributed computer systems. Node management can be centralized, mobile, or distributed. The invention provides for any counting number of process containers, which can be nested or mutually excluding. These and other variations upon and modifications to the disclosed embodiments are provided for by the present invention, the scope of which is defined by the following claims.

What is claimed is:

1. A method comprising:
    executing, using hardware and within a production process container, target production processes of a first instance of a target program, said first instance being all or part of or executing on an operating system;
    executing, in an installation process container separate from said production process container, an installation process to update said target program;
    attempting, by said installation process, an inter-process interaction target program, said inter-process interaction being such that, if not blocked, would interfere with execution of said first instance of said target program;
    blocking, by at least one of said production process container and said installation process container, of said inter-process interaction so that said at least one installation process does not interfere with execution of said first instance of said target program prior rebooting said hardware during or after updating said second instance of said target program; and
    without shutting down the first instance of said target program:
        creating, by a file system manager executing within said installation process container, a clone volume;
        copying, by the file system manager, an original root volume group including said first instance of said target program into the clone volume and
        redirecting, by the file system manager, calls from the original root volume group to the clone volume.

2. A method as recited in claim 1 further comprising rebooting so that said clone volume group becomes the active root volume group and so that the updated second instance of said target program is executed while said first instance of said target program is not executed.

3. A method as recited in claim 1 wherein said inter-process interaction would, if not blocked, shut down said first instance of said target program prior to modification of said second instance of said target program.

4. A computer system comprising:
    hardware including a processor;
    an original file system for storing original program files of an original instance of a target program;
    a file system manager for creating a clone file system and clone files for a clone instance of said target program by copying at least some of said original files and for storing said clone files in said clone file system, said processor providing for executing installation processes associated with an installation program configured to update said target program; and
    a process containment system for intercepting and controlling inter-process communications between said installation processes and said production processes so as to permit said installation processes to update said clone instance of said target program while blocking inter-process interactions between said installation processes and said production processes that, if not blocked, would interfere with execution of said computer system during or after updating said second instance of said target program, wherein the process containment system for intercepting and controlling inter-process communication includes an alternate file system manager.

5. A computer system as recited in claim 4 wherein said original files and said clone files include computer-executable programs, said programs including at least one operating system.

6. A computer system as recited in claim 4 wherein said process containment system permits at least some communications between said production processes and said installation processes.

7. A computer system as recited in claim 4 wherein said containment system prevents communication between said installation processes and said production processes.

8. A computer system as recited in claim 4 wherein said containment system provides at least one process container for said installation processes and at least one process container for said production processes so that said containment system blocks at least some inter-process communications between said installation processes and said production processes.

9. A computer system as recited in claim 8 wherein said containment system provides at least two process containers for said production processes to prevent at least some inter-process communications among said production processes for security purposes.

10. A computer system as recited in claim 4 wherein said inter-process interaction would, if not blocked, shut down said original instance of said target program prior to modification of said clone instance of said target program.

* * * * *